(12) United States Patent
Zhang et al.

(10) Patent No.: US 6,878,478 B2
(45) Date of Patent: Apr. 12, 2005

(54) SELECTIVE COATINGS FOR PEM FUEL CELL ELECTRODE CONTACTS

(75) Inventors: Jinping Zhang, Grand Blanc, MI (US); Rick D. Kerr, Fenton, MI (US); Charles D. Oakley, Davison, MI (US); David A. Thompson, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 161 days.

(21) Appl. No.: 10/217,964

(22) Filed: Aug. 13, 2002

(65) Prior Publication Data

US 2004/0033408 A1 Feb. 19, 2004

(51) Int. Cl.$^7$ ................................................. H01M 8/02
(52) U.S. Cl. ............................. 429/34; 429/38; 429/39
(58) Field of Search ............................. 429/34, 35, 36, 429/37, 38, 39

(56) References Cited

U.S. PATENT DOCUMENTS

| | | |
|---|---|---|
| 6,321,145 B1 | 11/2001 | Rajashekara |
| 6,423,896 B1 | 7/2002 | Keegan |
| 6,455,185 B2 | 9/2002 | Bircann et al. |
| 6,485,852 B1 | 11/2002 | Miller et al. |
| 6,509,113 B2 | 1/2003 | Keegan |
| 6,551,734 B1 | 4/2003 | Simpkins et al. |
| 6,562,496 B2 | 5/2003 | Faville et al. |
| 6,608,463 B1 | 8/2003 | Kelly et al. |
| 6,613,468 B2 | 9/2003 | Simpkins et al. |
| 6,613,469 B2 | 9/2003 | Keegan |
| 6,627,339 B2 | 9/2003 | Haltiner, Jr. |
| 6,630,264 B2 | 10/2003 | Haltiner, Jr. et al. |
| 2002/0009630 A1 * | 1/2002 | Gao et al. .................... 429/34 |

* cited by examiner

Primary Examiner—Michael Barr
Assistant Examiner—Monique Wills
(74) Attorney, Agent, or Firm—Paul L. Marshall

(57) ABSTRACT

A bipolar plate for use in a fuel cell assembly having channels for conveying oxygen and fuel along the cathode and anode surfaces of adjacent fuel cell units. The channels are separated by lands for making electrical and mechanical contact with the respective cathode and anode surfaces and preferably are so configured as to provide the minimum area required for satisfactory electrical contact and mechanical support. The lands and channels preferably are formed as peaks and valleys or as raised or recessed dimples for making electrical/mechanical contact with the cathode and anode surfaces and are coated in those contact areas with corrosion-resistant metal such as gold, platinum, ruthenium, or combinations thereof.

1 Claim, 2 Drawing Sheets

US 6,878,478 B2

SELECTIVE COATINGS FOR PEM FUEL CELL ELECTRODE CONTACTS

TECHNICAL FIELD

The present invention relates to fuel cells; more particularly, to fuel cells having bipolar plate electrodes; and most particularly, to means for increasing the reliability and durability of the electrical contact surface of a bipolar plate electrode.

BACKGROUND OF THE INVENTION

Fuel cell assemblies employing a plurality of individual fuel cell modules are well known. Each module has an anode and a cathode. In a proton-exchange fuel cell, the anode and cathode are separated by a catalytic proton exchange membrane (PEM). The modules in the stack typically are connected in series electrically through bipolar plates to provide a desired total output voltage. Fuel in the form of hydrogen and water vapor, or hydrogen-containing mixtures such as "reformed" hydrocarbons, is flowed through a first set of reaction channels formed in a first surface of the bipolar plate adjacent the anode. Oxygen, typically in the form of air, is flowed through a second set of reaction channels formed in a second surface of the bipolar plate adjacent the cathode.

In a PEM fuel cell, hydrogen is catalytically oxidized at the anode-membrane interface. The resulting proton, $H^+$, migrates through the membrane to the cathode-membrane interface where it combines with ionic oxygen to form water. Electrons flow from the anode through a load to the cathode, doing electrical work in the load.

In fuel cells, especially PEM fuel cells, a long-term electrical continuity problem is well known in the art. Metals typically used to form bipolar plates, for example, aluminum or stainless steel, either corrode or form high-resistance oxide passivation layers on the surface of the bipolar plates because of electrochemical activity at these surfaces. These oxide layers limit the current-collecting ability of the bipolar plates, significantly lowering the efficiency and output of a fuel cell. Further, due to the intrinsic properties of a preferred membrane, the environment for a bipolar plate is relatively acidic; pH values of 3.5 or lower are common. Further, cyclic voltage exists between the anode and cathode as the load on the fuel cell varies. The combination of low pH and cyclic voltage requires that the bipolar plate be very corrosion resistant, especially on surfaces making contact with the anode and cathode.

In the prior art, it is known to form bipolar plates of graphite/polymer composites, which are highly resistant to corrosion. Such materials are relatively brittle but have relatively high bulk resistivity. Therefore, such bipolar plates must be relatively thick for structural integrity and, contrastingly, relatively thin because of its high bulk resistivity. Further, such bipolar plates may be difficult and expensive to form and may be easily damaged during assembly of a fuel cell assembly.

In the prior art, bipolar plates formed of metal are known. Metals are advantageous over graphite/polymer as having a relatively low bulk resistivity, yet in being strong enough to form very thin plates, thereby reducing substantially the size and volume of a fuel cell assembly, and are relatively easy to form into channeled plates. However, as noted hereinabove, most metals or alloys are not able to provide sustained corrosion-free contact with the anode and/or cathode of a PEM fuel cell. It is known in the art to coat the entire surface of a metallic bipolar plate with noble metals such as gold or platinum to prevent corrosion, but such coatings require so large an amount of noble metals that this approach is cost-prohibitive.

What is needed is a simple and cost-effective means for maintaining electrical conductivity of the electrical-contact surfaces of a bipolar plate.

It is a principal object of the present invention to provide an improved bipolar plate which is simple and inexpensive to manufacture and which reliably maintains electrical conductivity and continuity of the surface during use in a fuel cell.

It is a further object of the invention to increase the durability and reliability of a fuel cell.

SUMMARY OF THE INVENTION

Briefly described, a bipolar plate for use in a fuel cell assembly includes channels for conveying oxygen and fuel along the cathode and anode surfaces of adjacent fuel cell units in the fuel cell assembly. The channels are separated by elevated points or lands for making electrical and mechanical contact with the respective cathode and anode surfaces. The lands preferably are so configured as to provide the minimum area required for satisfactory electrical contact and mechanical support, being coated in those contact areas with corrosion-resistant metal such as gold, platinum, ruthenium, or combinations thereof. By way of examples, such a bipolar plate can be formed as a substantially sinusoidally-corrugated sheet, or as a series of raised and recessed dimples in the sheet.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
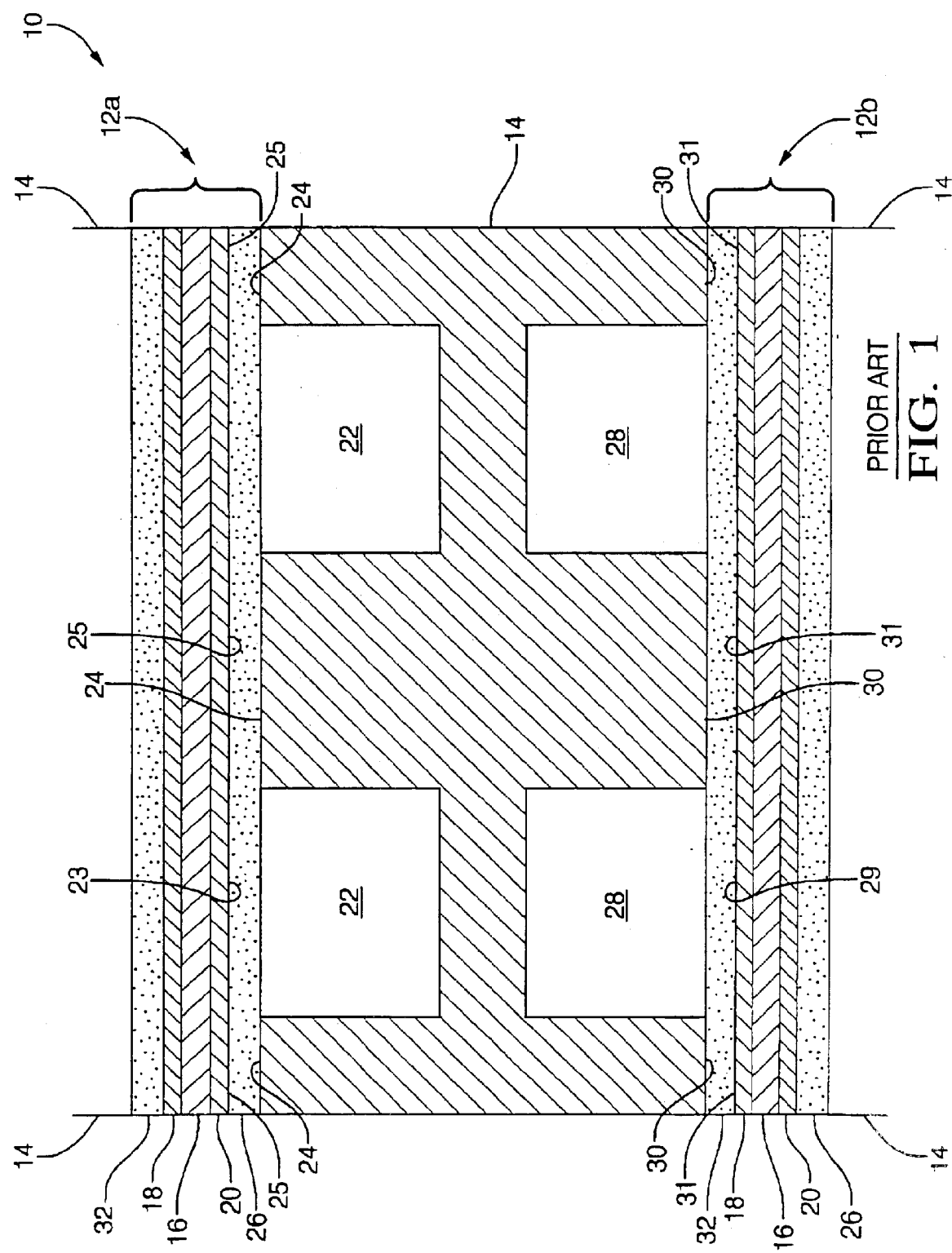
FIG. 1 is a schematic cross-sectional view of a portion of a fuel cell stack showing the relationship of a known bipolar plate to the anodes and cathodes of adjacent fuel cell units.

Referring to FIG. 1, a portion 10 of a known multiple-cell PEM fuel cell stack includes a first fuel cell unit 12a and a second fuel cell unit 12b, separated and mechanically/electrically connected by a bipolar plate 14. Elevated points or lands, generally shown as features 24 and 30 in FIG. 1, make the electrical/mechanical contacts. Plate 14 may be formed of, for example, a metal such as aluminum or stainless steel, or a conductive composite such as graphite/polymer. Each fuel cell unit 12a, 12b comprises a proton exchange membrane 16 separating an anode 18 and a cathode 20 in known fashion. A complete fuel cell stack (not shown) comprises a plurality of fuel cell units 12 similarly separated and connected by a plurality of bipolar plates 14.

Each bipolar plate 14 is provided with a first set of channels 22 for providing oxygen, typically in the form of air, to the cathode surface 23. Channels 22 are separated by first lands 24 for making the mechanical and electrical contact with cathode surface 23. Optionally, a conductive cathode diffuser 26 may be provided between cathode 20 and bipolar plate 14 to permit air to diffuse laterally and thereby reach those portions 25 of the cathode surface 23 covered by first lands 24.

Each bipolar plate 14 is provided with a second set of channels 28 for providing hydrogen fuel to the anode surface 29. Channels 28 are separated by second lands 30 for making the mechanical and electrical contact with anode surface 29. Optionally, a conductive anode diffuser 32 may be provided between anode 18 and bipolar plate 14 to permit fuel to diffuse laterally and thereby reach those portions 31 of the anode surface 29 covered by second lands 30. In the example shown in FIG. 1, first and second lands 24,30 typically may cover between about 10 and 30 percent of the cathode and anode surfaces 23,29, respectively. It should be understood that in an actual bipolar plate and fuel cell assembly, air and fuel channels 22 and 28 may be oriented orthogonally to each other within each bipolar plate.

Figure 2:
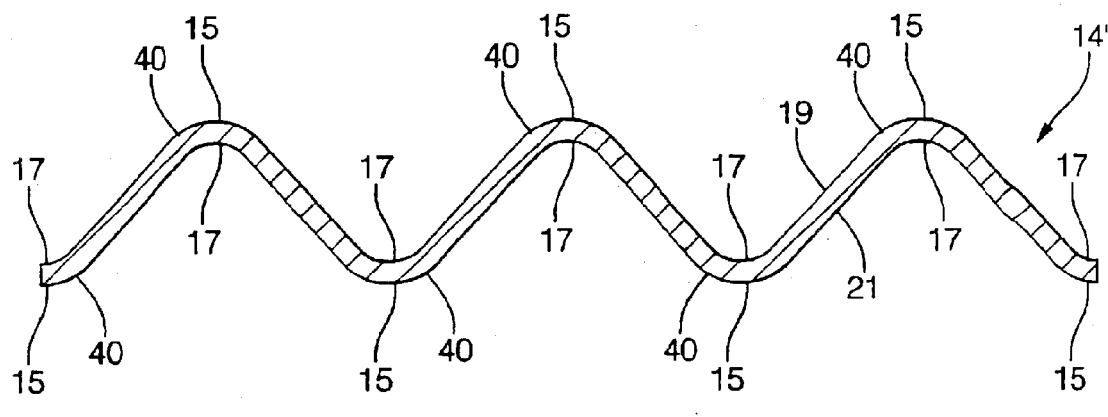
FIG. 2 is a schematic cross-sectional view of a portion of an improved bipolar plate in accordance with the invention.
Figure 3:
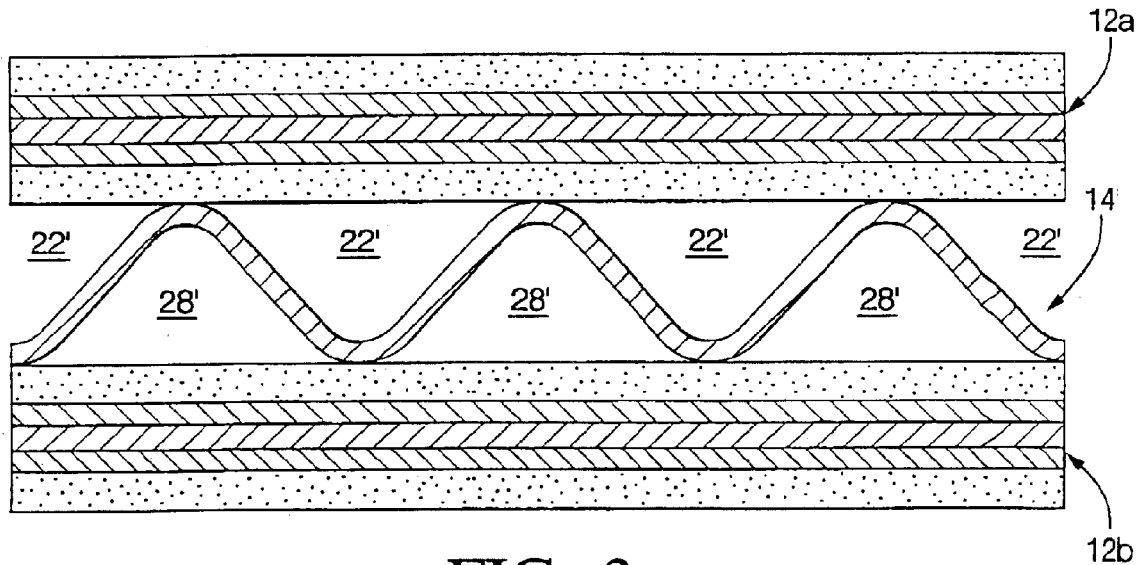
FIG. 3 is a schematic cross-sectional view of a portion of a fuel cell stack showing the relationship of a first and currently preferred embodiment of an improved bipolar plate, formed in accordance with the invention, to the anodes and cathodes of adjacent fuel cell units.
Figure 4:
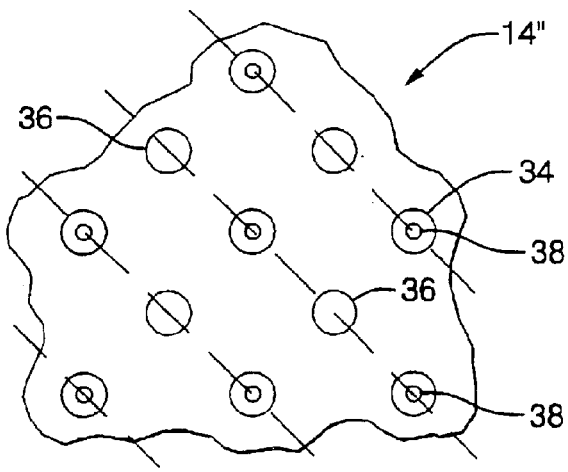
FIG. 4 is a plan view section of a bipolar plate in accordance with the present invention having a series or raised and recessed dimples.

Examples of how the elevated points or lands may be formed in the plates are shown in FIGS. 2–4. Referring to FIGS. 2 and 3, a first improved bipolar plate 14' in accordance with the invention may be formed as a corrugated element having peaks 15 and valleys 17 on both sides, forming interlocking first and second channels 22',28'. Improved bipolar plate 14' is preferably and easily formed in known fashion from sheet stock, preferably a self-passivating, corrosive resistant metal or alloy, for example, titanium or stainless steel. The peaks 15 on opposite surfaces of plate 14' define electrical and mechanical contact areas for the bipolar plate with adjacent cathode and anode surfaces 23,29, respectively.

Rather than coat the entire surfaces 19,21 of bipolar plate 14' with corrosion-resistant metals to prevent corrosion of the electrical contacts as in the known art described hereinabove, only those regions of surfaces 19,21 making electrical contact with the anodes and cathodes, namely peaks 15 and areas 40 immediately adjacent thereto, are so coated, thus substantially reducing the area to be covered, and the cost of so covering. In true corrugations, the peaks 15 make only tangential line contact with the anodes and cathodes and therefore have substantially zero contact area.

FIG. 4 shows, by way of example, a second way in which plates having elevated points or lands for making electrical/mechanical contact can be formed, and how the present invention would be applied to that example. Bipolar plate 14" shows a series of raised and recessed dimples 34,36, whose pattern can be evenly spaced or not. Raised dimple peaks 38 and recessed dimple peaks on the opposite side of the plate (not referenced) define the electrical/mechanical contact areas. In the present invention, only those regions making electrical/mechanical contact would be coated.

While the two examples shown of elevated points or lands include corrugations and dimples formed in the plates, it is understood that the elevated points or lands can be formed in any conceivable way including a waffle pattern or wave or "W" shaped corrugations for example, and still fall within the scope of this invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A bipolar plate for use in a fuel cell stack having anodes and cathodes, comprising,
    a) at least one non-planar continuous sheet stock member having at least one land for making contact with at least one of said anodes and cathodes; and
    b) a coating including corrosion-resistant materials disposed only on said at least one land to prevent corrosion of said sheet stock member at said contacting land, where in said plate is formed having at least one peak and at least one valley for making contact with at least one of said anodes and cathodes, wherein said peak and said valley correspond to said at least one land.

* * * * *